United States Patent [19]

Ikemoto et al.

[11] 4,400,989
[45] Aug. 30, 1983

[54] LUBRICATION MECHANISM IN CHANGE-SPEED GEARING UNIT

[75] Inventors: Kazuhito Ikemoto; Nobuaki Katayama; Yukio Terakura, all of Toyota; Kan Sasaki, Aichi, all of Japan

[73] Assignee: Toyota Jidosha Kogyo Kabushiki Kaisha, Aichi, Japan

[21] Appl. No.: 287,817

[22] Filed: Jul. 28, 1981

[30] Foreign Application Priority Data

Aug. 20, 1980 [JP] Japan .................. 55-117923

[51] Int. Cl.³ .................. F16H 57/04; F01M 9/00
[52] U.S. Cl. .................. 74/467; 184/6.12
[58] Field of Search ............ 74/467, 468; 184/6.12, 184/11 A, 8

[56] References Cited

U.S. PATENT DOCUMENTS

| | | | |
|---|---|---|---|
| 1,545,048 | 7/1925 | Flynn | 184/8 |
| 3,672,586 | 6/1972 | Morton | 184/6.12 |
| 4,348,914 | 9/1982 | Kawamota | 184/6.12 |

FOREIGN PATENT DOCUMENTS 2834700 4/1979 Fed. Rep. of Germany ........ 74/467
54-65256 5/1979 Japan ........................ 74/467
2019962 10/1979 United Kingdom .............. 74/467

*Primary Examiner*—Lawrence J. Staab
*Assistant Examiner*—Michael D. Bednarek
*Attorney, Agent, or Firm*—Oblon, Fisher, Spivak, McClelland & Maier

[57] ABSTRACT

A lubrication mechanism in a change-speed gearing unit in which an oil transfer trough is suspended in a fore-and-aft direction at one side of the inner wall of an extension housing secured at its front end to a transmission casing. The trough is fixed at its front end to the upper portion of the extension housing in such a way as to open toward the upper interior space of the transmission casing and fixed at its rear end to the rear portion of the side wall of the extension housing by means of a hollow bush of elastic material which is pressedly mounted within an axial groove in the rear portion of the side wall of the extension housing. The hollow bush is formed with a closed tubular portion coupled over the rear end of the trough and an outlet portion laterally extending from the tubular portion and opening toward the interior space above an oil well in the extension housing.

5 Claims, 6 Drawing Figures

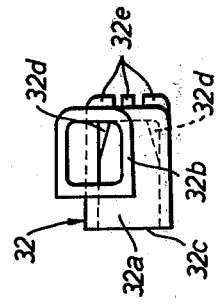

LUBRICATION MECHANISM IN CHANGE-SPEED GEARING UNIT

BACKGROUND OF THE INVENTION

The present invention relates to change-speed gearing units for automobiles, and more particularly to a lubrication mechanism in a change-speed gearing unit in which an oil transfer trough is suspended in a fore-and-aft direction at one side of the inner wall of an extension housing for the unit.

In general, such a conventional oil transfer trough as described above is made of pressed sheet metal and may have a number of manufacturing errors caused in the pressing process. To overcome such manufacturing errors, the oil transfer trough is attached in a tight manner to the side wall of the extension housing, causing undesired deformation of the trough. If the oil transfer trough is loosely attached to the inner wall of the extension housing to avoid such undesired deformation, undesired vibrations and unpleasant noises will occur. In application of the conventional oil transfer trough, it is also required to provide a lateral through hole in the side wall of the extension housing located at the rear end of the trough thereby to direct the flow of lubricating oil toward the interior space of the housing. The lateral through hole is formed by drilling the side wall of the extension housing and is closed by a plug element at its outer end. This increases the manufacturing cost of the lubrication mechanism.

SUMMARY OF THE INVENTION

It is, therefore, a primary object of the present invention to provide a lubrication mechanism in which a longitudinal oil transfer trough is suspended in place within an extension housing in such a way as to avoid any undesired vibrations and unpleasant noises caused by manufacturing errors in the trough.

According to the present invention briefly summarized, there is provided a lubrication mechanism in a change-speed gearing unit in which an output shaft extends in an axial direction through the interior of a housing assembly including an extension housing secured at its front end to a transmission casing, the extension housing being formed therein with an oil well which is located at the rear bottom portion of the extension housing to lubricate the support portion of the output shaft. The lubrication mechanism comprises a longitudinal oil transfer trough extending in a fore-and-aft direction at one side of the inner wall of the extension housing, the trough being fixed at its front end to the upper portion of the housing assembly in such a way as to open toward the upper interior space of the transmission casing and being fixed at its rear end to the rear portion of the side wall of the extension housing in such a way as to open toward the interior space of the extension housing, and a hollow bush of synthetic resin, preferably synthetic rubber, formed with a closed tubular portion coupled over the rear end of the trough and formed with an outlet portion laterally extending from the tubular portion and opening toward the interior space of the extension housing. The hollow bush is pressedly mounted within an axial groove formed in the rear portion of the side wall of the extension housing above the oil well in such a manner that the rear end of the trough is in open communication with the outlet portion of the bush.

BRIEF DESCRIPTION OF THE DRAWINGS

Additional objects and advantages of the present invention will be more readily apparent from the following detailed description of a preferred embodiment thereof when taken together with the accompanying drawings, in which:

FIG. 4 is a front view of a hollow bush shown in FIGS. 2 and 3;

FIG. 5 is a side view of the hollow bush; and

FIG. 6 is a rear view of the hollow bush.

DESCRIPTION OF THE PREFERRED EMBODIMENT

Figure 1:
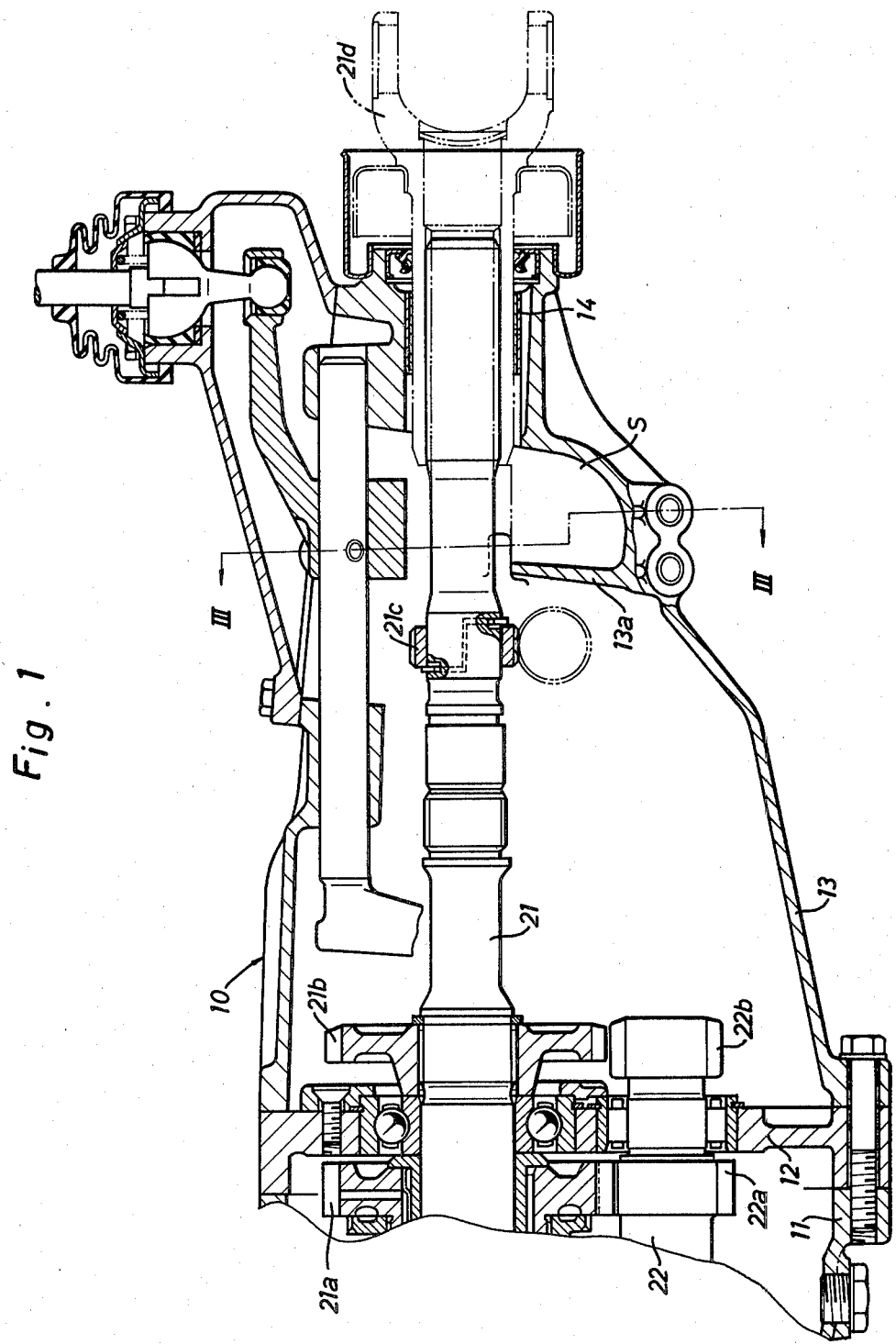
FIG. 1 is a sectional view of a change-speed gearing unit showing the rear interior of the unit.

Referring now to the drawings, FIG. 1 illustrates the rear interior of a change-speed gearing unit 10 of the direct operation type, in which an output shaft 21 extends in an axial direction through the interior of a housing assembly including an extension housing 13 secured in a fluid tight manner to a transmission casing 11 by way of an upright intermediate plate 12. The output shaft 21 is rotatably supported at its intermediate portion from the upright intermediate plate 12 and is provided thereon with a fourth-speed driven gear 21a and a reverse driven gear 21b. A countershaft 22 arranged in parallel with output shaft 21 is rotatably supported from the upright intermediate plate 12. The countershaft 22 is integrally provided thereon with a fourth-speed drive gear 22a permanently in mesh with the fourth-speed driven gear 21a and with a reverse drive gear 22b which is arranged in a usual manner to be meshed with the reverse driven gear 21b by way of an idler gear (not shown).

The output shaft 21 is also provided with a speedometer drive gear 21c fixed thereon which is in mesh with a speedometer driven gear. The output shaft 21 is splined at its rear end with a sleeve-like yoke 21d which is rotatably and axially slidably supported by a rear bush 14 carried in the rear end portion of extension housing 13. The rear bush 14 is lubricated by lubricating oil which is stored in an oil well S formed by a lateral wall 13a within extension housing 13. In the figure, the liquid surface of the stored lubricating oil is indicated by an imaginary line.

Figure 2:
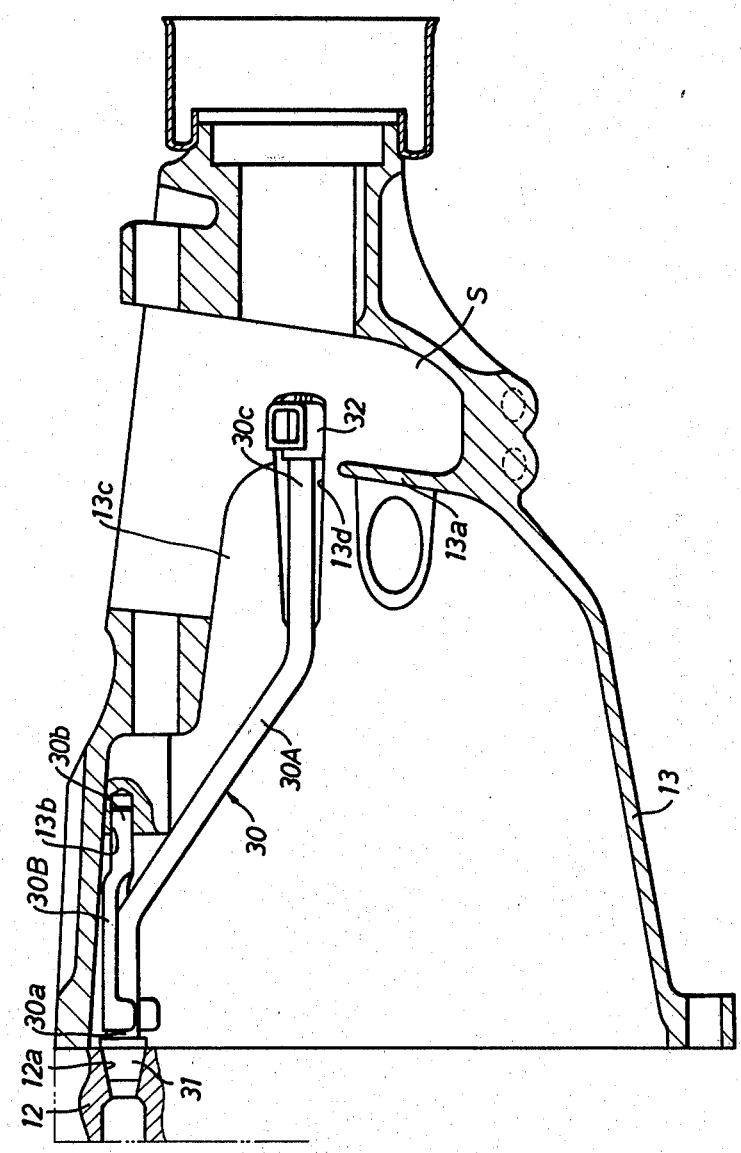
FIG. 2 illustrates an oil receiver assembly suspended at one side of the inner wall of an entension housing for the unit.
Figure 3:
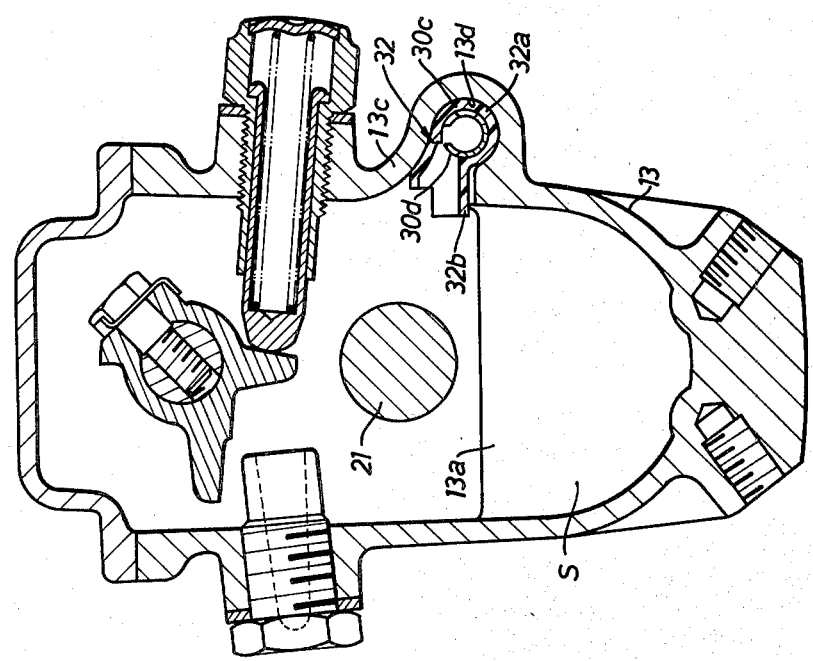
FIG. 3 is a cross-sectional view taken along line III—III in FIG. 1.

As can be well seen in FIG. 2, an oil receiver assembly 30 is bridged fore-and-aft at one side of the inner wall of extension housing 13 to conduct the supply of lubricating oil into the oil well S. The oil receiver assembly 30 includes a tubular oil transfer trough 30A of pressed sheet metal and a clamp member 30B of pressed sheet metal secured to the front end portion of trough 30A. To suspend in place the oil receiver assembly 30, the tubular trough 30A is engaged at its front end 30a within an axial tapered hole 12a in upright intermediate plate 12 by means of a tapered tubular bush 31 of synthetic rubber and is further engaged at its rear end 30c within an axial groove 13d in the side wall 13c of extension housing 13 by means of a hollow bush 32 of synthetic resin, preferably synthetic rubber. Furthermore, the clamp member 30B is pressedly mounted at its rear end 30b within an axial counter-bore 13b in the side wall of extension housing 13. The axial groove 13d, shown in FIGS. 2 and 3, is formed by a forward sliding die during the casting of extension housing 13 to open forwards and to the side.

As shown in FIGS. 3 through 6, the hollow bush 32 is formed with a closed tubular portion 32a coupled over the rear end 30c of trough 30A and an outlet portion 32b laterally extending from the closed tubular portion 32a and opening into the interior space of extension housing 13 to allow the lubricating oil to flow into oil well S through oil transfer trough 30A. The hollow bush 32 is also formed at the inner wall of its tubular portion 32a with five equidistantly spaced axial projections 32d which are tapered toward the front opening 32c of bush 32 and arranged to be engaged with the rear end 30c of trough 30A. Formed on the outer surface of the closed end of bush 32 are four radial projections 32e which are pressedly engaged within the closed rear end portion of axial groove 13d to resiliently support the rear end 30c of trough 30A. In addition, the oil transfer trough 30A is formed at its rear end with a recess 30d corresponding with the opening of outlet portion 32b of bush 32.

With the above arrangement of the oil receiver assembly 30, the oil transfer trough 30A receives at its front end 30a lubricating oil picked up by gears 21a, 22a in transmission casing 11 and transfers the lubricating oil rearwards. Then, the hollow bush 32 serves to deflect the flow of transferred lubricating oil through its lateral outlet portion 32b and to drop the lubricating oil into the oil well S so as to lubricate the rear bush 14.

In the assembling process of the oil receiver assembly 30, firstly the rubber bush 31 is coupled over the front end of trough 30A, and the hollow bush 32 is coupled over the rear end of trough 30A. Secondly, the hollow bush 32 is pressedly mounted within the axial groove 13d, and simultaneously the rear end 30b of clamp member 30B is pressedly inserted into the counter bore 13b to preliminarily attach the oil receiver assembly to the inner wall of extension housing 13. Thereafter, the rubber bush 31 is pressedly mounted within the tapered hole 12a in upright intermediate plate 12 to suspend in place the oil receiver assembly 30. Thus, the rubber bush 31 serves to absorb undesired vibrations at the front end of trough 30A, and the hollow bush 32 serves to absorb undesired vibrations at the rear end of trough 30A thereby preventing unpleasant noises caused by the vibration of trough 30A. Even if the oil receiver assembly 30 were to be constructed with manufacturing errors, the resiliency of bush 31 and/or bush 32 would serve to avoid undesired deformation of trough 30A caused by such manufacturing errors. Furthermore, provision of the hollow bush 32 mounted within the axial groove 13d eliminates the need of the drilling operation necessary in a conventional construction for forming a lateral hole in the side wall of the extension housing. In the case that the above-described manufacturing errors can be eliminated in the actual practices by the provision of the hollow bush 32 alone, the tapered rubber bush 31 may be eliminated. It is also noted that the shape of hollow bush 32 may be modified according to necessity.

Although a certain specific embodiment of the present invention has been shown and described, it is obvious that many modifications and variations thereof are possible in light of these teachings. It is to be understood therefore that within the scope of the appended claims, the invention may be practiced otherwise than as specifically described herein.

What is claimed is:

1. A lubrication mechanism in a change-speed gearing unit in which an output shaft extends in an axial direction through the interior of a housing assembly including an extension housing secured at its front end to a transmission casing, said extension housing being formed therein with an oil well which is located at the rear bottom portion of said extension housing to lubricate the support portion of said output shaft, the lubrication mechanism comprising:

a longitudinal oil transfer trough extending in a fore-and-aft direction at one side of the inner wall of said extension housing, said trough being fixed at its front end to the upper portion of said housing assembly in such a way as to open toward the upper interior space of said transmission casing and being fixed at its rear end to the rear portion of the side wall of said extension housing in such a way as to open toward the interior space of said extension housing; and a hollow bush of elastic material formed with a closed tubular portion coupled over the rear end of said trough and integrally formed with an outlet portion laterally extending from said tubular portion and opening toward the interior space of said extension housing, said hollow bush being pressedly mounted within an axial groove formed in the rear portion of the side wall of said extension housing above said oil well in such a manner that the rear end of said trough is in open communication with the outlet portion of said bush.

2. A lubrication mechanism as claimed in claim 1, wherein said tubular portion of said bush is formed at its inner peripheral wall with a plurality of axial projections which are tapered toward the front opening of said bush and arranged to be pressedly engaged with the rear end of said trough.

3. A lubrication mechanism as claimed in claim 1 or 2, wherein said tubular portion of said bush is formed at the outer surface of its closed end with a plurality of radial projections which are pressedly engaged within the closed rear end portion of said axial groove to resiliently support the rear end of said trough.

4. A lubrication mechanism as claimed in claim 1, further comprising a clamp member secured to the front portion of said trough and having a rear end engaged within a counter-bore formed in the upper portion of the side wall of said extension housing.

5. A lubrication mechanism as claimed in claim 1, further comprising a tapered tubular bush of elastic material coupled over the front end of said trough and pressedly mounted within a tapered hole in the upper portion of an upright intermediate plate between said extension housing and said transmission casing.

* * * * *